United States Patent
Cummins

[19]

[11] Patent Number: 5,949,175
[45] Date of Patent: Sep. 7, 1999

[54] BRUSH HOLDER FOR ELECTRIC MOTOR

[75] Inventor: Craig Richard Cummins, Manton, Mich.

[73] Assignee: Rexair, Inc., Troy, Mich.

[21] Appl. No.: 09/019,015

[22] Filed: Feb. 5, 1998

[51] Int. Cl.$^6$ ............................. H02K 5/18; H01R 39/38
[52] U.S. Cl. ............................................ 310/239; 310/64
[58] Field of Search ........................... 310/64, 239, 242, 310/247

[56] References Cited

U.S. PATENT DOCUMENTS

| | | | |
|---|---|---|---|
| 441,256 | 11/1890 | Reese, Jr. | 310/239 |
| 585,746 | 7/1897 | Geisenhoner | 310/239 |
| 661,228 | 11/1900 | Reist | 310/239 |
| 1,273,647 | 7/1918 | Moore | 310/239 |
| 2,822,487 | 2/1958 | Barel | 310/258 |
| 3,028,515 | 4/1962 | Cheetham | 310/247 |
| 3,123,732 | 3/1964 | Jackson | 310/247 |
| 3,436,576 | 4/1969 | Klebe, Jr. | 310/239 |
| 4,266,155 | 5/1981 | Niemela | 310/239 |
| 4,329,612 | 5/1982 | Averill | 310/247 |
| 4,340,832 | 7/1982 | Cheetham et al. | 310/239 |
| 4,359,656 | 11/1982 | Fasterding et al. | 310/239 |
| 4,366,404 | 12/1982 | Ziegler | 310/239 |
| 4,371,803 | 2/1983 | Schindel et al. | 310/242 |
| 4,458,378 | 7/1984 | Helmes | 15/415 |
| 5,055,728 | 10/1991 | Looper et al. | 310/91 |
| 5,262,694 | 11/1993 | Frank | 310/239 |
| 5,315,199 | 5/1994 | McCracken et al. | 310/239 |
| 5,343,106 | 8/1994 | Lungu et al. | 310/239 |
| 5,608,280 | 3/1997 | Tamemoto et al. | 310/239 |

*Primary Examiner*—Clayton E. LaBalle
*Attorney, Agent, or Firm*—Howard & Howard

[57] ABSTRACT

A brush holder assembly having a housing die cast from zinc which includes a plurality of integrally formed heat-sinking fins and an integrally formed mounting wall. The heat-sinking fins permit the housing of the brush holder assembly to dissipate heat generated during operation of a motor to which the brush holder assembly is secured. The integrally formed mounting wall enables the entire brush holder assembly to be quickly and easily secured to a housing of a motor. The heat-sinking fins further help to prolong the life of the brush housed within the brush holder assembly.

11 Claims, 3 Drawing Sheets

5,949,175

BRUSH HOLDER FOR ELECTRIC MOTOR

BACKGROUND OF THE INVENTION

1. Technical Field

This invention relates to brush holder assemblies for electric motors, and more particularly, to a brush holder assembly having integrally formed cooling fins and other integrally formed components which enable the brush holder to be more easily and readily secured to a motor housing and to more effectively dissipate heat from the brush holder generated during use of the electric motor.

2. Discussion

Brush holders for electric motors typically consist of a component which is roll-formed or broached out of brass. The brush holder is some form of opening for supporting at least a portion of a motor brush therein when the brush holder is secured to the motor housing. The brush holder acts to hold the brush in contact with a commutator of an electric motor during operation of the motor. The brush holder also provides a means by which an electrical connection can be made to the motor brush.

The drawback with conventional roll-formed or broached brush holders is the lack of design detail which may be incorporated into the design because of the roll-forming or broaching process. Accordingly, design attributes to allow for enhanced cooling of the brush holder, and/or easing the manner in which the brush holder may be attached to a motor housing, cannot be readily accommodated through roll-forming or broaching construction processes. Thus, design features which enhance the cooling of the brush holder or its ease of mounting require additional component parts, manufacturing steps and/or assembly techniques if they are to be incorporated with convention roll-formed or broached brush holder housings. Since cost is often an important consideration in the manufacture of brush holder assemblies, adding such component parts, manufacturing steps and/or assembly steps can often add significantly to the per-unit cost of a brush holder assembly, making such design changes, even though desirable performance-wise, undesirable from a cost standpoint.

Accordingly, there is a need for a brush holder or an electric motor which provides some means for enhancing the cooling of the brush holder housing and enabling the brush holder housing to be quickly and easily coupled to a motor housing via conventional fastening elements. There is also a need for a brush holder which can be easily coupled to a motor housing without unnecessarily complicating the construction process of the overall brush holder assembly or significantly increasing its cost.

SUMMARY OF THE INVENTION

The above-described limitations are overcome by a brush holder assembly in accordance with preferred embodiments of the present invention. The brush holder assembly of the present invention comprises an integrally formed, die-cast zinc brush holder housing having an elongated bore formed therein. The housing advantageously includes a plurality of integrally formed fins projecting outwardly therefrom which act as heat sinks to help dissipate heat from the brush holder housing during operation. The housing further includes an integrally formed mounting wall which enables the brush holder housing to be quickly and easily secured to a motor housing.

The brush holder assembly of the present invention further includes a brush, a flexible shunt electrically secured to the brush and an electrically conductive end cap positioned at one extreme end of the bore against an end wall of the brush holder housing. A biasing member in the form of a spring is disposed between the end cap and the brush to bias the brush outwardly of the bore and into contact with a commutator of the electric motor.

In the preferred embodiments of the present invention, the brush holder housing includes a terminal portion projecting outwardly therefrom to which an external electrical connector may be secured to receive the electrical signal received by the brush. Since the housing of the electrical terminal is electrically conductive and in electrical communication with the end cap, there is no need for any assembly steps in securing a separate terminal component to the brush holder housing or body.

By forming a brush holder body through a die casting procedure, the brush holder housing of the present invention is able to be formed with the above-described features which significantly enhance its utility. The additional cooling provided by the heat-sinking fins of the brush holder housing of the present invention can contribute to increased brush life. The design of the brush holder housing of the present invention further enhances the ease in which the housing may be physically secured to a motor housing during assembly.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

Figure 1:
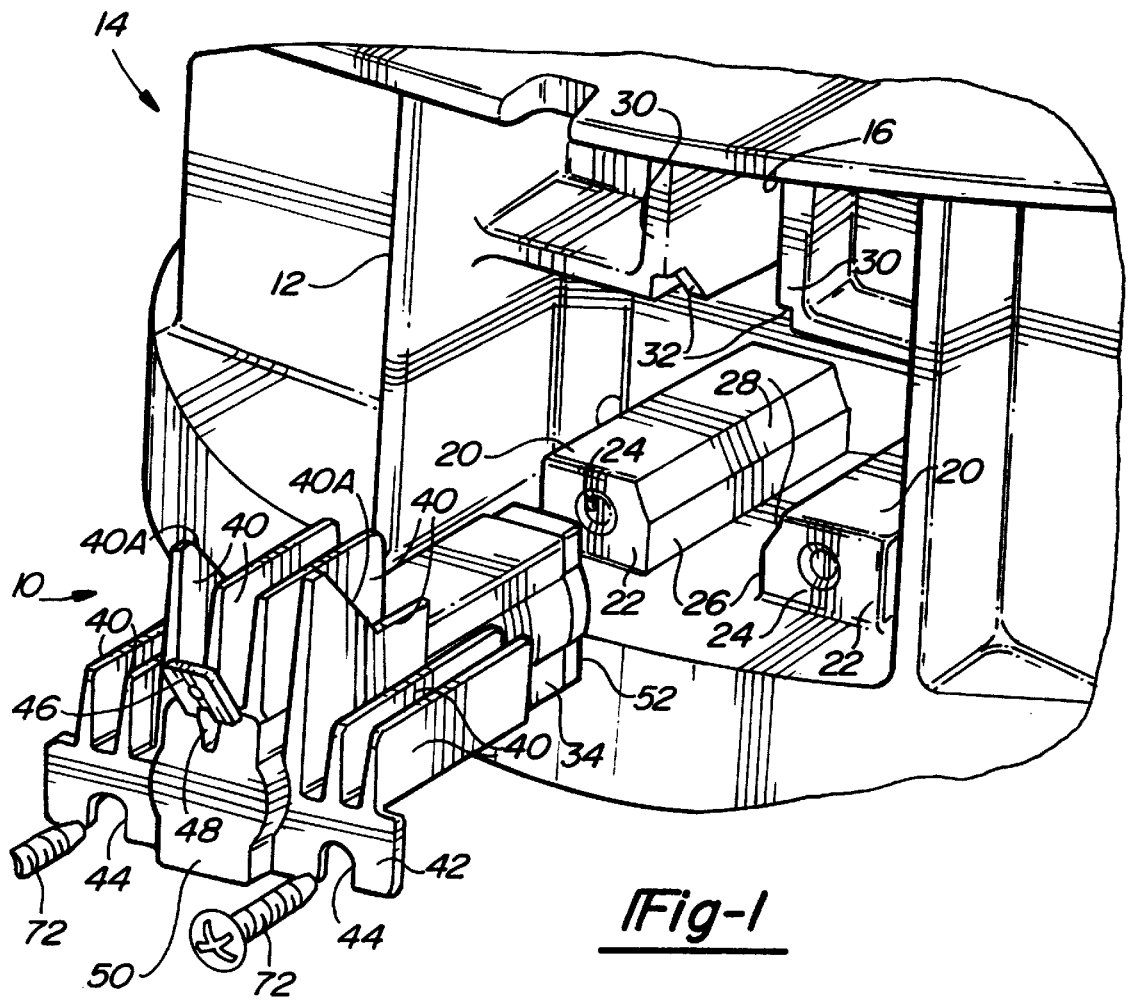
FIG. 1 is an exploded perspective view of the brush holder, brush and a portion of a motor housing to which the brush holder assembly of the present invention may be secure.
Figure 3:
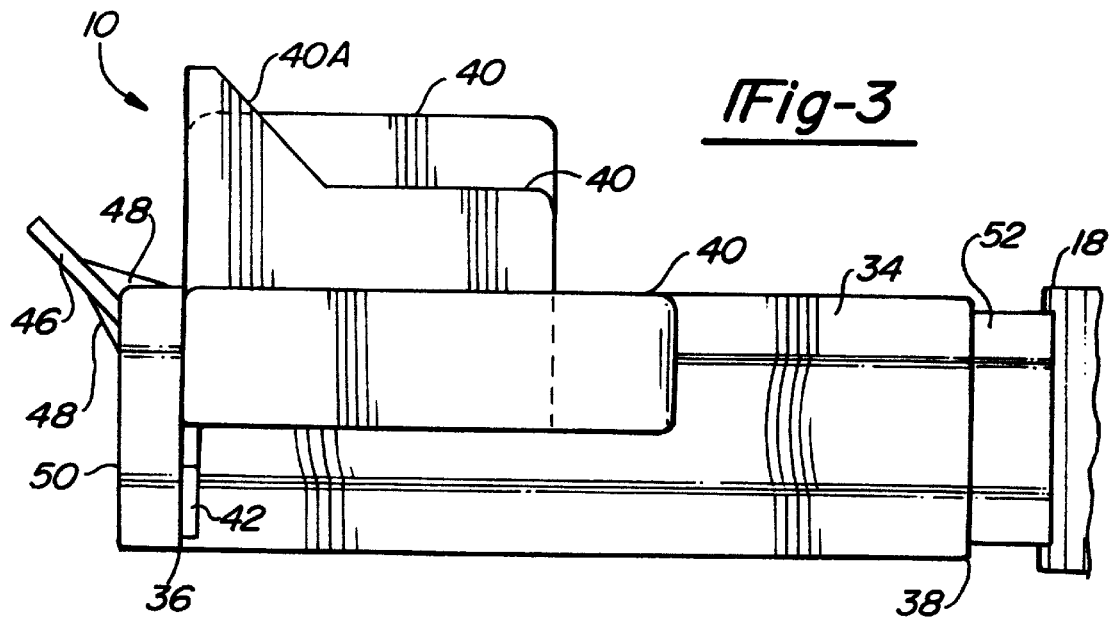
FIG. 3 is a side view of the brush holder, brush and commutator.

Referring to FIG. 1, there is shown a brush holder assembly 10 in accordance with the present invention. The brush holder assembly 10 is shown in exploded fashion relative to a motor housing 12 of a motor 14 to which it is secured. The motor housing 12 includes an opening 16 which permits the brush holder assembly 10 to be mounted in close relation to a commutator 18 (as shown in FIG. 3) of the motor 14. The opening 16 includes a pair of spaced apart, integrally formed, mounting blocks 20 extending longitudinally into the opening 16 of the housing 12. Each mounting block 20 includes a front face 22 with a threaded bore 24 therein. Each mounting block 20 further includes a flat inner surface 26 and a semicircular corner portion 28 extending from said flat inner surface forming a contoured channel or passageway between the blocks 20 and into the opening 16. The contoured channel formed by the opposing flat inner surfaces 26 and corner portions 28 of each block 20 helps support the brush holder assembly 10 firmly in place when the assembly 10 is secured to the motor housing 12, as will be explained in greater detail in the following paragraphs.

With continued reference to FIG. 1, the motor housing 12 also includes a pair of integrally formed, upper side walls 30 formed in the opening 16. The front section of each wall 30 includes a tapering support wall portion 32 which also helps to support the brush holder assembly 10 securely in place within the opening 16. The upper side walls 30 having the tapering support wall portions 32 are further spaced-apart a predetermined distance, the reason for which will be explained momentarily.

Figure 4:
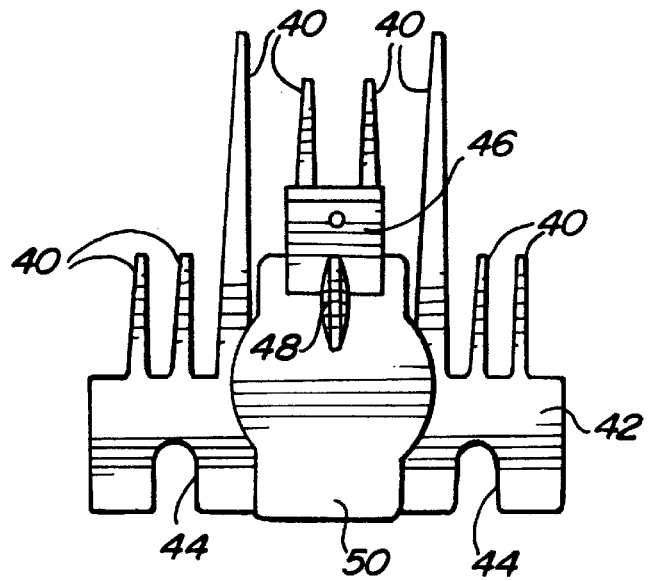
FIG. 4 is a rear end view of the brush holder.

Referring now to FIGS. 1, 3 and 4, the brush holder assembly 10 will be described in detail. The brush holder assembly 10 includes a longitudinally extending brush holder housing 34 extending between first 36 and second 38 ends. The housing 34 supports a plurality of integrally formed heat-sinking cooling fins 40 and an integrally formed mounting wall 42. The cooling fins 40 project upwardly from the housing 34 and partially along the housing 34 from the first end 36 toward the second end 38. The fins 40 are arranged in parallel rows spanning across the width of the housing 34 and are further supported by the integrally formed mounting wall 42 adjacent the first end 36 of the housing 34. In FIG. 4, the integrally formed mounting wall 42 can be seen to include a pair of semi-circular notches 44 through which external fastening elements, such as threaded screws shown in FIG. 1, may be inserted. It will be noted that cooling fins 40 vary in height and length according to the available space in opening 16 and desired heat dissipation. Further, two of the cooling fins 40 have a tapered wall portion 40a which tapers at an angle complimentary to the angle of the tapering support wall portions 32 described in connection with FIG. 1. Referring to FIG. 3, the brush holder housing 34 also includes an integrally formed terminal portion 46 and a brace portion 48 which braces the terminal portion 46 against a rear wall 50 of the housing 34. The rear wall 50 is secured to the first end 36 of the housing 34 against the mounting wall 42. The brush holder housing 34 is die cast from zinc rather than roll-formed or broached as with conventional brush holder housings. By die casting the housing 34 from zinc, the heat-sinking cooling fins 40, as well as the integrally formed mounting wall 42, are able to be easily formed. The heat-sinking fins 40 significantly help to dissipate heat build-up in the brush holder housing 34 during use of the motor 14, while the integrally formed mounting wall 42 facilitates quick and easy securing of the brush holder assembly 10 to the motor housing 12.

Figure 2:
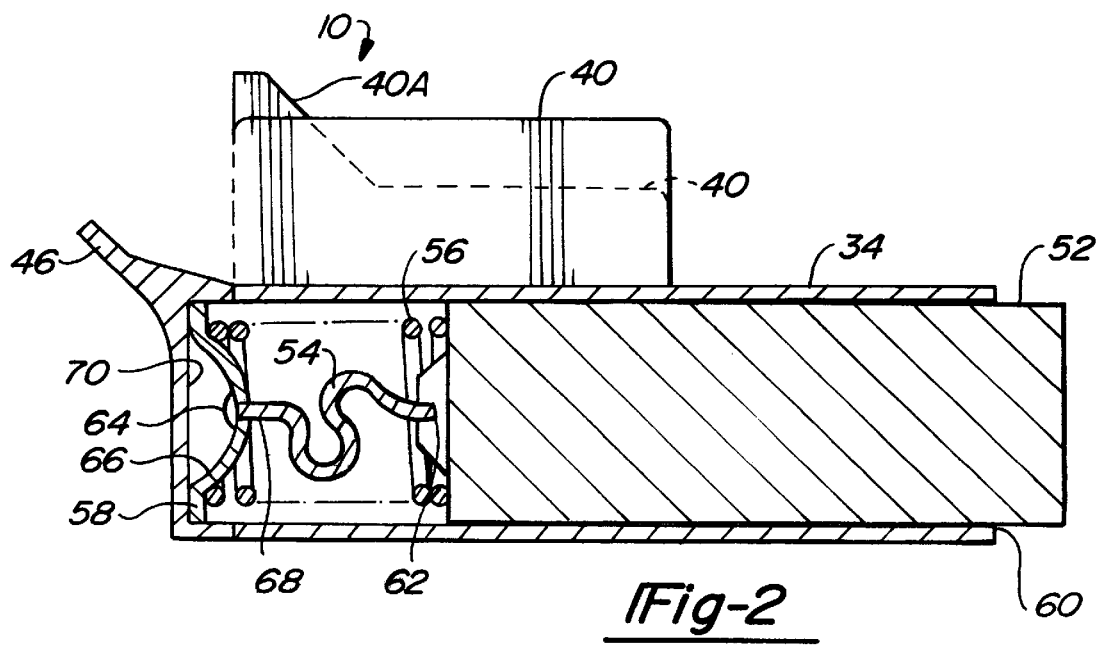
FIG. 2 is a cross-sectional side view of the brush holder assembly of FIG. 1 in accordance with section line 2—2 of FIG. 1.

Referring now to FIG. 2, the brush holder assembly 10 can be seen to include a brush 52 which is a conventional carbon brush; a braided, flexible shunt 54; a biasing member in the form of a coil spring 56 and an end cap 58. The brush holder housing 34 includes a bore 60 having dimensions slightly larger than the brush 52 for receiving the brush 52 therein. A first end 62 of the shunt 54 is fixedly, electrically secured to the carbon brush 52, while a second end 64 is fixedly, electrically secured to the end cap 58 such as by rivet, by soldering, welding or any other form of attachment which provides an electrical connection between the shunt 54 and the end cap 58. The end cap 58 further has a concave portion 66 with a centrally disposed opening 68 at which the second end 64 of the shunt 54 is secured. The concave portion 66 of the end cap 58 allows a small degree of clearance to accommodate a rivet head, a solder joint, etc.

With further reference to FIG. 2, when the brush holder assembly 10 is assembled, one end of the shunt 54 is secured first either to the brush 52 or to the end cap 58. The opposite free end of the shunt 54 is then extended through the coil spring 56 before the free end is secured to the remaining one of the end cap 58 or brush 52. The entire end cap 58, shunt 54, spring 56 and brush 52 may then be inserted into the bore 60 of the brush holder housing 34 with the end cap 58 being inserted first. Once the end cap 58 contacts an inner wall portion of the rear wall 50, the brush 52, shunt 54, end cap 58 and terminal portion 46 will form a complete current path.

Figure 5:
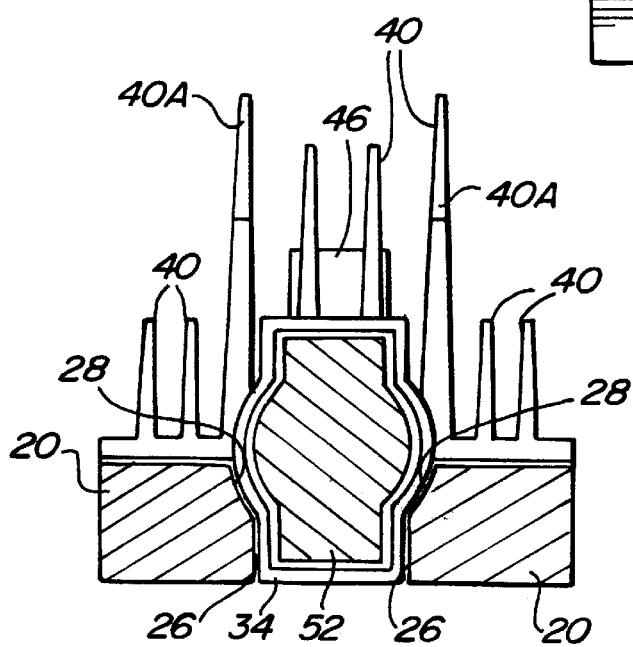
FIG. 5 is a front end view of the brush holder assembly supported in an opening of the motor housing between a pair of mounting blocks shown in cross-section.
Figure 6:
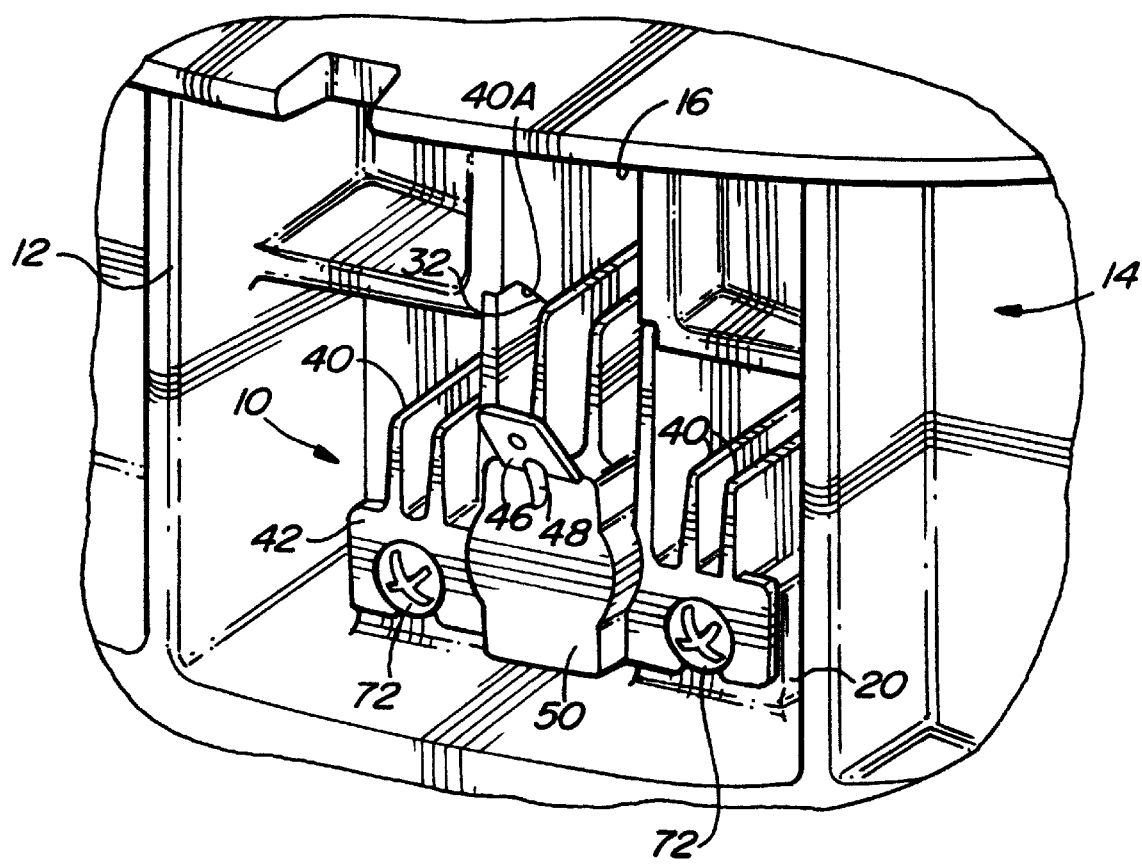
FIG. 6 is a perspective view of the brush holder and brush secured to the motor housing.

Referring now to FIGS. 5 and 6, the brush holder assembly 10 is secured to the motor housing 12 after the brush 52 is inserted in the bore 60 by inserting the brush holder housing 34 into the opening 16 of the motor housing 12. The flat inner surfaces 26 and semi-circular corner portions 28 of the integrally formed mounting blocks 20 conform to and engage the main body portion of the housing 30 and the tapering support walls 40a of pair of heat-sinking fins 40 engage the tapering support wall portions 32 of the motor housing 12. When the brush holder assembly 10 is fully inserted, the brush 52 will be urged inwardly slightly due to abutting engagement with the commutator 18 of the motor 14. The integrally formed mounting wall 42 will also be resting flush against the front surfaces 22 of the mounting blocks 20 with the semi-circular notches 44 in approximate alignment with the threaded bores 24. At this point, while the brush holder assembly 10 is held with one or more fingers against the mounting blocks 20, a pair of threaded screws 72 may be advanced into the threaded bores 24 to securely hold the brush holder assembly 10 within the opening 16.

The heat-sinking fins 40 help to significantly dissipate heat from the housing 34 and the brush 52 during use of the motor 14. The integrally formed mounting wall 42 also helps to enable quick and easy assembly of the brush holder assembly 10 to the motor housing 12. The die cast construction of the brush holder assembly 10 of the present invention thus enables a number of structural features to be included which enhance the overall performance of the brush holder assembly 10.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A motor housing for receiving a brush holder for an electric motor comprising:

an opening recessed in said motor housing for receiving and securing said brush holder in said motor housing;

said opening partially formed by a pair of spaced apart mounting blocks defining a channel therebetween for receiving said brush holder;

a brush holder housing having an elongated bore, wherein said bore includes a first opened end and a second closed end;

said brush holder housing further including a plurality of spaced-apart, elongated, heat-sinking fins integrally formed therewith for dissipating heat from said housing and an integrally formed mounting wall for securing said brush holder to said mounting blocks;

a brush disposed within said elongated bore;

an electrically conductive end cap positioned against said closed end of said bore;

a biasing member disposed between said end cap and said brush for biasing said brush towards said open end of said bore; and a shunt electrically connected between said end cap and said brush.

2. A motor housing and brush holder as set forth in claim 1 wherein said brush holder housing includes an elongated body forming said bore and extending from said mounting wall into said channel.

3. A motor housing and brush holder as set forth in claim 2 wherein said heat sinking fins extend from said mounting wall and are received in said opening above said mounting blocks.

4. A motor housing and brush holder as set forth in claim 3 wherein said opening is further formed by a pair of spaced apart upper side walls for engaging at least one of said heat-sinking fins in said opening.

5. A motor housing and brush holder as set forth in claim 4 wherein said brush holder housing comprises an electrically conductive plate forming said closed end and having an integrally formed electrical terminal member projecting outwardly therefrom for enabling said brush holder to be electrically coupled to the motor and electrically communicate with said end cap, shunt and brush.

6. A motor housing and brush holder as set forth in claim 5 further including a braided, flexible shunt having a first end electrically connected to said brush and a second end electrically connected to said end cap.

7. A motor housing and brush holder as set forth iin claim 6 wherein said housing comprises a die cast member formed from zinc.

8. A motor housing and brush holder as set forth in claim 7 wherein said opening further houses a commutator engaged by said brush.

9. A motor housing and brush holder as set forth in claim 8 wherein at least one of said heat-sinking fins includes a tapering wall portion and said upper side walls include a tapering support wall for engaging and supporting said tapering wall portion of said fin.

10. A motor housing and brush holder as set forth in claim 9 wherein said mounting blocks include a flat inner surface and a contoured corner portion defining said channel and conforming to the contoured configuration of said body of said brush holder housing.

11. A motor housing and brush holder as set forth in claim 10 wherein mounting wall includes a pair of spaced-apart, semicircular notches for enabling a pair of external fastening elements to pass therethrough and secure said brush holder to said motor housing.

* * * * *